(12) United States Patent
Nishiyama

(10) Patent No.: US 6,284,383 B1
(45) Date of Patent: Sep. 4, 2001

(54) LAMINATED GLASS FOR GREENHOUSE

(75) Inventor: Masanori Nishiyama, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/297,132

(22) PCT Filed: Oct. 31, 1997

(86) PCT No.: PCT/JP97/03991

§ 371 Date: Apr. 26, 1999

§ 102(e) Date: Apr. 26, 1999

(87) PCT Pub. No.: WO98/19975

PCT Pub. Date: May 14, 1998

(30) Foreign Application Priority Data

Nov. 5, 1996 (JP) .................................................. 8-292511
Nov. 15, 1996 (JP) .................................................. 8-304775

(51) Int. Cl.$^7$ .......................... B32B 17/10; C03C 17/38; C03C 17/42; A01G 9/14
(52) U.S. Cl. ................... 428/430; 47/17; 47/19; 47/26; 47/28.1; 47/29; 428/451; 428/458
(58) Field of Search ................... 47/17, 26, 28.1, 47/29, 19; 428/430, 458, 451

(56) References Cited

U.S. PATENT DOCUMENTS 4,799,745   1/1989   Meyer et al. .................... 350/1.7

FOREIGN PATENT DOCUMENTS

| | | |
|---|---|---|
| 0 269 469 | 6/1988 | (EP) . |
| 0 279 722 | 8/1988 | (EP) . |
| 0 378 917 | 7/1990 | (EP) . |
| 52-115839 | 9/1977 | (JP) . |
| 54-66227 | 5/1979 | (JP) . |
| 61-58527 | 3/1986 | (JP) . |
| 61-58528 | 3/1986 | (JP) . |
| 64-14129 | 1/1989 | (JP) . |
| 4-504555 | 8/1992 | (JP) . |
| 5-116258 | 5/1993 | (JP) . |
| 6-1950 | 1/1994 | (JP) . |
| 7-256088 | 10/1995 | (JP) . |

*Primary Examiner*—D. S. Nakarani
(74) *Attorney, Agent, or Firm*—Sughrue, Mion, Zinn, Macpeak & Seas, PLLC

(57) ABSTRACT

A glass laminate for greenhouse, comprising a heat ray-reflecting film laminated on one side of a transparent glass, which glass laminate is characterized in that (1) the heat ray-reflecting film comprises a transparent thermoplastic resin film and at least one metal oxide layer and at least one metal layer, both formed on one side of the resin film, (2) the glass laminate has the heat ray-reflecting film laminated, via an adhesive layer, on one side of the transparent glass, at the side opposite to the thermoplastic resin film side, (3) the glass laminate has a film for prevention of growth of the waterdrops formed by dew condensation, which is formed on the surface of the thermoplastic resin film, and (4) the glass laminate has an integral transmittance of 55% or more for a visible light having a wavelength of 400 nm to less than 750 nm and an integral transmittance of 50% or less for a near-infrared light having a wavelength of 750 nm to less than 2,100 nm; and a greenhouse wherein the above glass laminate is used at the lighting area so that the glass surface is positioned outside the greenhouse.

The glass laminate for greenhouse of the present invention has excellent transmission for visible light and is superior in prevention of daytime temperature increase inside greenhouse, prevention of nocturnal radiational cooling and prevention of falling of the waterdrops formed by dew condensation.

16 Claims, No Drawings

LAMINATED GLASS FOR GREENHOUSE

TECHNICAL FIELD

The present invention relates to a glass laminate for greenhouse. More particularly, the present invention relates to a glass laminate for greenhouse, which has excellent transmission for visible light and which is very effective for prevention of scattering of shattered pieces of glass at breakage, prevention of daytime temperature increase inside greenhouse, prevention of nocturnal radiational cooling, prevention of glass fogging caused by the dew condensation occurring owing to difference in temperature between greenhouse inside and outside, and prevention of falling of the waterdrops formed by said dew condensation. The present invention further relates to a greenhouse in which the above glass laminate is used at the lighting area.

BACKGROUND ART

Greenhouses are horticulture facilities covered with glass windows at the whole area. In greenhouses covered mainly with a transparent plate glass, glass breakage is dangerous to workers because the shattered pieces of glass mix with the soil in greenhouse. Glass has had further problems in that since glass has high transmittance to sunlight and high heat conductivity, the temperature inside greenhouse becomes very high in the daytime in summer, requiring a high cost for cooling and to the contrary, in the night in winter, the temperature inside greenhouse becomes low owing to radiational cooling, requiring a cost for heating.

In order to solve these problems, it has been conducted to attach, to the glass windows of greenhouse, a film for prevention of scattering of broken pieces of glass, or a sunlight-control film having a metal or metal oxide layer formed by vapor deposition (i.e. a heat ray-reflecting film).

For example, greenhouses having a heat ray-reflecting film attached to the glass of the lighting area thereof are proposed in JP-A-54-66227, JP-A-61-58527 and JP-A-61-58528. These proposals, however, have a main object of reducing the energy (e.g. fuel oils) required for the heating of greenhouse inside, and make no suggestion on any persistent and effective means for prevention of growth of the waterdrops formed by dew condensation.

With these film-attached glass windows, there has been a problem in that dew condensation takes place owing to the difference in temperature between greenhouse inside and outside, at the side of window facing the inside of greenhouse, i.e. at the film side of window, and it hinders the transmission of sunlight or induces the falling of waterdrops from the greenhouse ceiling, giving adverse effects on horticulture crops.

In order to solve this problem, it has been conducted to coat a surfactant on the film surface of window facing the inside of greenhouse. However, this approach had no persistent effect and had no practical applicability.

TASK TO BE ACHIEVED BY THE INVENTION

An object of the present invention is to provide a glass laminate for greenhouse, which is very effective for prevention of scattering of shattered pieces of glass at breakage, prevention of daytime temperature increase inside greenhouse, prevention of nocturnal radiational cooling, prevention of glass fogging caused by the dew condensation occurring owing to difference in temperature between greenhouse inside and outside, and prevention of growth and falling of waterdrops.

Other object of the present invention is to provide a glass laminate for greenhouse, which has the above-mentioned properties and exhibits the properties persistently.

MEANS FOR ACHIEVING THE TASK

The study by the present invention found out that the above objects of the present invention can be achieved by a glass laminate for greenhouse, comprising a heat ray-reflecting film laminated on one side of a transparent glass, which is characterized in that (1) the heat ray-reflecting film comprises a transparent thermoplastic resin film, at least one metal oxide layer and at least one metal layer, on one side of the resin film, (2) the glass laminate has the heat ray-reflecting film laminated, via an adhesive layer, on one side of the transparent glass, at the side opposite to the thermoplastic resin film side, (3) the glass laminate has a film for prevention of growth of the waterdrops formed by dew condensation, which is formed on the surface of the thermoplastic resin film, and (4) the glass laminate has an integral transmittance of 55% or more for a visible light having a wavelength of 400 nm to less than 750 nm and an integral transmittance of 50% or less for a near-infrared light having a wavelength of 750 nm to less than 2,100 nm.

The glass laminate of the present invention is utilized by using it at the lighting area of greenhouse. The construction of the present glass laminate is described below. To make the description simple, "at least one metal oxide layer and at least one metal layer" in the heat ray-reflecting film is hereinafter referred to simply as "heat ray-reflecting layer". The detailed constitution of this heat ray-reflecting layer will be described later.

The glass laminate of the present invention has a constitution of a transparent glass/an adhesive layer/a heat ray-reflecting layer/a thermoplastic resin film/a film for prevention of growth of waterdrops. This glass laminate is used at the lighting area of greenhouse so that the side of the transparent glass is positioned outside the greenhouse and the side of the film for prevention of growth of waterdrops is positioned inside the greenhouse.

In a greenhouse, the glass laminate is used, in most cases, at the lighting area of house side and sloping roof.

The constitution of the present glass laminate is described in detail below.

In the glass laminate of the present invention, the transparent glass can be an ordinary transparent plate glass as long as it satisfies the optical properties required for the glass laminate. In particular, a plate glass conventionally used for greenhouses may be used as it is. As the transparent glass, a glass having such a thickness of 2.5 to 6 mm, in particular about 3 mm, as specified by JIS R 3202 can be used preferably.

In the present glass laminate, the heat ray-reflecting film is constituted by the above-mentioned heat ray reflecting layer and a film (hereinafter referred to as "base film" in some cases). The base film is a thermoplastic resin film which is transparent and flexible. Such a base film is desirably a heat-resistant thermoplastic resin film since a heat ray-reflecting layer is formed thereon by sputtering, vacuum deposition or the like. Preferred examples of the polymer forming the thermoplastic resin film are polyesters typified by polyethylene terephthalate and polyethylene-2,6-naphthalate; aliphatic polyamides; aromatic polyamides;

polyethylene; polypropylene; or the like. Of these, polyesters are more preferred. Of these thermoplastic films, a biaxially stretched polyethylene terephthalate film superior in heat resistance and mechanical strengths is particularly preferred.

Such a thermoplastic resin film can be produced by a known process. A biaxially stretched polyester film, for example, can be produced by drying a polyester, melting the dried polyester using an extruder at a temperature of Tm to (Tm+70)° C. (Tm is the melting point of the polyester), extruding the molten polyester from the die (for example, T-die, I-die or the like) onto a rotary cooling drum to rapidly cool it at 40 to 90° C. to produce an unstretched film, stretching the unstretched film at a temperature of (Tg−10) to (Tg+70)° C. (Tg is the glass transition temperature of the polyester) in a stretch ratio of 2.5 to 8.0 in its longitudinal direction, then stretching the resulting film in a stretch ratio of 2.5 to 8.0 in the transverse direction, and as necessary heat-setting the resulting film at a temperature of 180 to 250° C. for 1 to 60 seconds. The obtained film preferably has a thickness of 5 to 250 μm.

In the present invention, the heat ray-reflecting film has a structure in which a heat ray-reflecting layer is formed on one side of the above-mentioned base film. The heat ray-reflecting layer is constituted by at least one metal oxide layer and at least one metal layer.

The order of the metal oxide layer (layer A) and the metal layer (layer B) has no restriction as long as each of the two layers exists by at least one layer. The combination of the layer A and the layer B can be exemplified by A-B, A-B-A, A-B-A-B-A and A-B-A-B-A-B-A. In these combinations, when each of A and B exists by two layers, the two layers may be the same or different.

The metal oxide layer (layer A) is preferably composed of $TiO_2$, $ZrO_2$ or $In_2O_3$, and such a metal oxide layer is a transparent, highly refractive dielectric layer. When the metal oxide layer is composed of $TiO_2$ or $ZrO_2$, the layer is preferably formed from an organic compound by hydrolysis of alkyl titanate or alkyl zirconate, because such a layer has excellent processability. The formation of the metal oxide layer (layer A) is preferably conducted by coating using a solvent or by a vapor deposition. Vapor deposition such as vacuum deposition, sputtering or plasma CVD is particularly preferred. Further, the metal oxide layer preferably has a laminate structure in which the metal layer (layer B) is interposed between metal oxide layers in a sandwich form, because the resulting glass laminate exhibits higher transparency. The thickness of such a metal oxide layer must be determined together with the metal layer so that the above-mentioned optical properties of the glass laminate are satisfied. The thickness of the metal oxide layer is preferably, for example, 5 to 100 nm.

Meanwhile, the metal layer (layer B) constituting the heat ray-reflecting layer is composed of at least one metal selected from the group consisting of silver (Ag), gold (Au), copper (Cu) and aluminum (Al). Of these metals, Ag, which has substantially no absorption toward visible light, or a mixture of Ag and other metal is preferred. The metal layer (layer B) is formed preferably by a vapor deposition, and specifically, vacuum deposition, sputtering or plasma CVD is preferably employed. The thickness of the metal layer (layer B) is determined so that the above-mentioned optical properties of the glass laminate are satisfied, and the thickness is appropriately, for example, 5 to 50 nm.

In the glass laminate of the present invention, a film for prevention of the waterdrops formed by dew condensation is formed on the thermoplastic resin film surface of the heat ray-reflecting film. Since the film for prevention of growth of the waterdrops formed by dew condensation is formed on one side of the glass laminate, even when dew condensation takes place on the glass laminate owing to the difference in temperature between greenhouse inside and outside, the minute waterdrops formed flow away on the film surface in a filmy state or run down along on the glass surface in the form of small waterdrops before the waterdrops grow into a large size and fall. Anyway, there is no case that waterdrops in a large size fall on the horticulture crops in greenhouse.

In the present invention, the film for prevention of growth of the waterdrops formed by dew condensation, which is to be formed on the thermoplastic resin film, can be any film, as long as it can prevent growth of the waterdrops into large size on the film surface and allow the waterdrops to run down along on the film in the form of small waterdrop or flow away in a filmy state. Specific examples of such a preventive film are a hydrophilic film or a water-repellent film. In the case where there is no film for prevention of growth of waterdrops, that is, when the surface of the thermoplastic resin film per se that is made of any of polyester, polyamide or polyolefin has a contact angle of about 60 to 90° C. against water and, when dew condensation takes place and waterdrops are formed, the waterdrops grow into a large size and are liable to fall from the film surface.

In contrast, in the present glass laminate having, at one side, a film for prevention of growth of the waterdrops formed by dew condensation, there is no case that waterdrops grow into such a large size as to cause falling of waterdrops from the surface of the film. As one type of the film for prevention of growth of waterdrops, there is a hydrophilic film having a contact angle against water, of 50° C. or less, preferably 40° C. or less, particularly preferably 30° C. or less. The lower limit of the contact angle is not particularly restricted but is 5° C. in view of the properties of available materials. As a hydrophilic film has a smaller contact angle toward water, it has higher wettability; and the waterdrops formed on such a film by dew condensation make no growth into large size and flow away in the form of liquid film along on the film surface. The hydrophilic film is preferably a film composed mainly of a siloxane (a siloxane film). The siloxane film is formed by subjecting a reactive ethyl silicate compound (e.g. orthoethyl silicate) to hydrolysis to form a silanol and these, subjecting the silanol to dehydration and condensation. These reactions are represented by the following formulas.

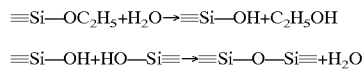

The reactive ethyl silicate compound is commercially available and, for example, Colcoat P (a product of Colcoat Co., Ltd.) can be used. It is desirable that the siloxane film has a thickness of 0.02 to 0.1 μm, preferably 0.03 to 0.08 μm.

Other type of the film for prevention of growth of waterdrops, used in the present glass laminate, is a water-repellent film. On this water-repellent film, there occurs no growth of the waterdrops formed by dew condensation into such a large size as to cause falling of waterdrops, and waterdrops run down along on the film surface in the form of small waterdrop. The water-repellent film desirably has a contact angle against water, of 90° C. or more, preferably 100° or more. The upper limit of the contact angle is generally 130° C., particularly about 120° C. Suitable as the water-repellent film is a film obtained by coating a crosslinkable silicone resin on the film and crosslinking the resin. The crosslinkable silicone resin is a resin composed mainly of a polysiloxane and having, at the terminal or part of the side chains, a vinyl group, hydroxyl group or phenyl group.

The resin is cured by a catalyst such as platinum, tin oxide or the like, whereby a crosslinked silicone resin film is obtained. The crosslinked silicone resin film desirably has a thickness of 0.01 to 10 μm, preferably 0.1 to 1 μm.

There is no restriction as to the production process of the glass laminate of the present invention as long as the glass laminate is constituted as mentioned above. The glass laminate is produced generally by first producing the above-mentioned heat ray-reflecting film, then forming, on the surface of the thermoplastic resin side thereof, a film for prevention of growth of the waterdrops formed by dew condensation, and thereafter laminating the resulting heat ray-reflecting film, via an adhesive layer, on a plate glass at the side opposite to the film for prevention of growth of waterdrops.

The heat ray-reflecting film is laminated on the plate glass via an adhesive. As the adhesive used in the lamination, there can be used an adhesive of acrylic type, rubber type or silicone type. An acrylic type adhesive is particularly preferred because it is superior in resistance to light exposure and transparency.

The acrylic type adhesive contains, as polymer components, a main monomer (such as n-butyl acrylate, isooctyl acrylate, 2-ethylhexyl acrylate, isononyl acrylate or the like), a comonomer (such as acrylonitrile, vinyl acetate, methyl methacrylate, ethyl acrylate or the like) and a functional monomer (such as acrylic acid, methacrylic acid, hydroxyethyl acrylate, glycidyl methacrylate, N-methylolmethacrylamide or the like), and may further contain, as necessary, a tackifier (e.g. rosin type or petroleum type), a softening agent, a filler, an antioxidant and a crosslinking agent.

The adhesive layer has a thickness of generally 1 to 50 μm, preferably 5 to 30 μm.

The glass laminate of the present invention has characteristic properties that it is transparent and has a high transmittance for visible light and a high reflectance for heat ray. That is, the present glass laminate has an integral transmittance of 55% or more, preferably 60% or more for a visible light having a wavelength of 400 nm to less than 750 nm and an integral transmittance of 50% or less, preferably 45% or less for a near-infrared light having a wavelength of 750 nm to less than 2,000 nm. A glass laminate having a visible light transmittance of lower than 55% has low transparency and is not preferred. Meanwhile, a glass laminate having a near-infrared light transmittance of higher than 50% has a low shielding effect for heat ray and is not preferred.

The glass laminate of the present invention is superior in visible light transmission and near-infrared-shielding property and is, therefore, effective for prevention of daytime temperature increase inside greenhouse as well as for prevention of nocturnal temperature decrease inside greenhouse owing to radiational cooling. Further, since a film for prevention of growth of the waterdrops formed by dew condensation is formed on film side facing the inside of the greenhouse, even when waterdrops are formed on the film by dew condensation, the waterdrops do not fall from the sloped ceiling of the greenhouse, and this effect is persistent.

Furthermore, the present glass laminate is prevented from becoming fogging. In addition, the present glass laminate causes no scattering of shattered pieces of glass and has high safety.

EXAMPLES

The present invention is described in more detail below by way of Examples. Incidentally, measurements of the properties of heat ray-reflecting film were conducted according to the following methods.

(1) Contact Angle

A glass laminate was placed on a horizontal table so that the heat ray-reflecting film side of the glass laminate was directed upward. Water was injected from a syringe to form a waterdrop on the heat ray-reflecting film of the glass laminate. The waterdrop was allowed to stand for one minute, and the interface between the waterdrop and the heat ray-reflecting film was observed from the side direction by using a microscope provided with an goniometer, to read the contact angle (θ) of the heat ray-reflecting film against waterdrop.

(2) Growth of Waterdrop

A glass laminate having a heat ray-reflecting film on one side thereof was fixed above a hot water bath of 90° C. at an inclination angle of 45° C. so that steam generating from the hot water bath hit the heat ray-reflecting film surface. The waterdrops formed on the film by dew condensation was visually evaluated and rated according to the following standard.

◯: Waterdrops flow down and the transparency of the glass laminate was good.

Δ: The transparency of the glass laminate was slightly bad.

×: The transparency of the glass laminate was bad owing to the presence of minute waterdrops.

(3) Integral Transmittance for Visible Light and Integral Transmittance for Near-infrared Light These two optical properties were measured for the following wavelength ranges, using a UV-3101PC model, a product of Shimadzu Corporation.

Integral transmittance for visible light is determined by measuring a visible light transmittance for a wavelength range of 400 nm to less than 750 nm, calculating a product of solar energy intensity and transmittance by each 50 nm, and dividing the total of the individual products by the total of solar energy intensity from 400 nm to less than 750 nm.

Integral transmittance for near-infrared light is determined by conducting the same operation as above, in a wavelength range of 750 nm to less than 2,100 nm.

(4) Prevention of Scattering of Shattered Glass Pieces

Prevention of scattering of shattered glass pieces was measured according to JIS A 5759 and was rated according to the following standard.

◯: There was substantially no scattering of shattered glass pieces.

Δ: There was slight scattering of shattered glass pieces.

×: All the shattered glass pieces scattered.

Example 1

An indium oxide layer (a metal oxide layer; the first layer) having a thickness of 15 nm was formed on one side of a biaxially oriented polyethylene terephthalate film having a thickness of 50 μm. On the first layer was formed a thin silver layer (the second layer) having a thickness of 14 nm and then, thereon was formed an indium oxide layer (the third layer) having a thickness of 20 nm. Incidentally, the formation of each of the first to third layers was conducted by sputtering under vacuum ($5 \times 10^{-5}$ Torr). Next, on the side opposite to the first to third layers, i.e. on the polyethylene terephthalate film side, was applied a coating solution (Colcoat P, a product of Colcoat Co., Ltd.) composed mainly of a siloxane, to produce a heat ray-reflecting film.

The heat ray-reflecting film was attached, using an adhesive, to a float glass having a thickness of 3 mm, in such a way that the side having the metal oxide layer (the first layer) of the heat ray-reflecting film was adhered to the float glass. In the attaching operation, a rubber roller was used to avoid the entering of air into the interface between the film and the glass. The properties of the resulting glass laminate are shown in Table 1.

Example 2

A glass laminate comprising a heat ray-reflecting film and a glass plate was produced in the same manner as in Example 1 except that the metal oxide was changed to titanium oxide. The properties of the glass laminate are shown in Table 1.

Comparative Example 1

A glass laminate comprising a heat ray-reflecting film and a glass plate was produced in the same manner as in Example 1 except that there was no application of the coating solution (Colcoat P) composed mainly of a siloxane. The properties of the glass laminate are shown in Table 1.

Comparative Example 2

The properties of the glass plate itself used in Example 1 are shown in Table 1. The properties shown are those of the glass per se.

TABLE 1

| | Contact angle (°) | Growth of waterdrop | Integral transmittance for visible light (%) | Integral transmittance for near-infrared light (%) | Prevention of scattering |
|---|---|---|---|---|---|
| Ex. 1 | 28 | ○ | 69 | 43 | ○ |
| Ex. 2 | 28 | ○ | 70 | 42 | ○ |
| C.Ex.1 | 70 | X | 72 | 45 | ○ |
| C.Ex.2 | 6 | ○ | 91 | 92 | X |

Ex.: Example; C.Ex.: Comparative Example

Example 3

On one side of a polyethylene terephthalate (PET) film having a thickness of 50 μm were formed titanium oxide (metal oxide) layers as the first layer and the third layer, each in a thickness of 10 nm. Also, a thin silver layer of 12 nm was formed as the second layer (the first, second and third layers were formed in this order), whereby a heat ray-reflecting film was produced. Each of the titanium oxide layers and the thin silver layer was formed by sputtering under vacuum.

To the PET film surface side of the heat ray-reflecting film was applied, at an amount of 5 g/m² (wet), a water-repellent coating solition, i.e. a solution (of a solid content of 2%) obtained by adding 2 parts by weight of a curing agent to 100 parts by weight of a silicone (TPR-6700 (trade name), a product of Toshiba Silicone K.K.) and diluting the resulting mixture with a mixed solvent of methyl ethyl ketone and toluene. The application was conducted under conditions of drying at 150° C. and a residence time of 30 seconds. The glass laminate had the following constitution shown in Table 2. The properties of the glass laminate are shown in Table 3.

TABLE 2

Sun

Glass
Adhesive layer
Metal oxide layer
Metal layer
Metal oxide layer
Transparent film
Water-repellent film Greenhouse Inside Comparative Example 3

A glass laminate was produced in the same operation as in Example 3 except that there was no treatment for water-repellence (no water-repellent film was formed). The glass laminate was tested for the same items as in Example 3.

TABLE 3

| | Contact angle (°) | Growth of waterdrop | Integral transmittance for visible light (%) | Integral transmittance for near-infrared light (%) | Prevention of scattering |
|---|---|---|---|---|---|
| Ex. 3 | 103 | ○ | 70 | 41 | ○ |
| C.Ex. 3 | 70 | X | 72 | 40 | ○ |

Preferred embodiments of the glass laminate of the present invention are described below.

1. A glass laminate for greenhouse, comprising a heat ray-reflecting film laminated on one side of a transparent glass, which glass laminate is characterized in that (1) the heat ray-reflecting film comprises a transparent thermoplastic resin film and at least one metal oxide layer and at least one metal layer, both formed on one side of the resin film, (2) the glass laminated has the heat ray-reflecting film laminated, via an adhesive layer, on one side of the transparent glass, at the side opposite to the thermoplastic resin film side, (3) the glass laminate has a hydrophilic film having a contact angle against water, of 50° C. or less, which is formed on the surface of the thermoplastic resin film, and (4) the glass laminate has an integral transmittance of 55% or more for a visible light having a wavelength of 400 nm to less than 750 nm and an integral transmittance of 50% or less for a near-infrared light having a wavelength of 750 nm to less than 2,100 nm.

2. A glass laminate according to the above item 1, wherein the thermoplastic resin film is a biaxially oriented polyethylene terephthalate film.

3. A glass laminate according to the above item 1, wherein a hydrophilic film having a contact angle against water, of 40° C. or less is formed on the surface of the thermoplastic resin film.

4. A glass laminate according to the above item 1 or 3, wherein the hydrophilic film is a siloxane film.

5. A glass laminate according to the above item 1, wherein the metal oxide layer is a layer composed of titanium oxide, zirconium oxide or indium oxide.

6. A glass laminate according to the above item 1, wherein the metal layer is a layer of at least one kind of metal selected from the group consisting of silver, gold, copper and aluminum.

7. A glass laminate according to the above item 1, wherein the integral transmittance for a visible light having a wavelength of 400 nm to less than 750 nm is 60% or more.

8. A glass laminate according to the above item 1, wherein the integral transmittance for a near-infrared light having a wavelength of 750 nm to less than 2,100 nm is 45% or less.

9. A glass laminate for greenhouse, comprising a heat ray-reflecting film laminated on one side of a transparent glass, which glass laminate is characterized in that
  (1) the heat ray-reflecting film comprises a transparent thermoplastic resin film and at least one metal oxide layer and at least one metal layer, both formed on one side of the resin film,
  (2) the glass laminate has the heat ray-reflecting film laminated, via an adhesive layer, on one side of the transparent glass, at the side opposite to the thermoplastic resin film side,
  (3) the glass laminate has a water-repellent film having a contact angle against water, of 90° C. or more, which is formed on the surface of the thermoplastic resin film, and
  (4) the glass laminate has an integral transmittance of 55% or more for a visible light having a wavelength of 400 nm to less than 750 nm and an integral transmittance of 50% or less for a near-infrared light having a wavelength of 750 nm to less than 2,100 nm.

10. A glass laminate according to the above item 9, wherein the thermoplastic resin film is a biaxially oriented polyethylene terephthalate film.

11. A glass laminate according to the above item 9, wherein a water-repellent film having a contact angle against water, of 100° C. or more is formed on the surface of the thermoplastic resin film.

12. A glass laminate according to the above item 9 or 11, wherein the water-repellent film is a crosslinked silicone resin film.

13. A glass laminate according to the above item 9, wherein the metal oxide layer is a layer composed of titanium oxide, zirconium oxide or indium oxide.

14. A glass laminate according to the above item 9, wherein the metal layer is a layer of at least one kind of metal selected from the group consisting of silver, gold, copper and aluminum.

15. A glass laminate according to the above item 9, wherein the integral transmittance for a visible light having a wavelength of 400 nm to less than 750 nm is 60% or more.

16. A glass laminate according to the above item 9, wherein the integral transmittance for a near-infrared light having a wavelength of 750 nm to less than 2,100 nm is 45% or less.

17. A greenhouse wherein a glass laminate set forth in the above item 1 or 9 is used at the lighting area so that the glass surface is positioned outside the greenhouse.

What is claimed is:

1. A glass laminate for a greenhouse, comprising in order
  (1) a transparent glass substrate,
  (2) an adhesive layer,
  (3) a heat ray-reflecting layer consisting of the combination of at least one metal-oxide layer and at least one metal layer one after the other,
  (4) a transparent thermoplastic resin film, and
  (5) a film for the prevention of growth of waterdrops formed by dew condensation, said film being a hydrophilic film having a contact angle of 500 or less against water and being a siloxane film,
  wherein the glass laminate has an integral transmittance of 55% or more for a visible light having a wavelength of 400 nm to less than 750 nm and integral transmittance of 50% or less for a near-infrared light having a wavelength of 750 nm to less than 2,100 nm.

2. A glass laminate according to claim 1, wherein the transparent thermoplastic resin film is a biaxially stretched polyethylene terephthalate.

3. A glass laminate according to claim 1, wherein the film for prevention of growth of the waterdrops formed by dew condensation is a hydrophilic film having a contact angle of 40° or less against water.

4. A glass laminate according to claim 1, wherein the metal oxide layer is a layer composed of titanium oxide, zirconium oxide or indium oxide.

5. A glass laminate according to claim 1, wherein the metal layer is a layer of at least one kind of metal selected from the group consisting of silver, gold, copper and aluminum.

6. A glass laminate according to claim 1, wherein the integral transmittance for a visible light having a wavelength of 400 n-m to less than 750 nm is 60% or more.

7. A glass laminate according to claim 1, wherein the integral transmittance for a near-infrared light having a wavelength of 750 nm to less than 2,100 nm is 45% or less.

8. A greenhouse wherein a glass laminate set forth in claim 1 is used at the lighting area so that the glass surface is positioned outside the greenhouse.

9. A glass laminate for a greenhouse, comprising in order
  (1) a transparent glass substrate,
  (2) an adhesive layer,
  (3) a heat ray-reflecting layer consisting of the combination of at least one metal oxide layer and at least one metal layer one after the other,
  (4) a transparent thermoplastic resin film, and
  (5) a film for the prevention of growth of waterdrops formed by dew condensation,
  said film being a water-repellent film having a contact angle of 900 or more against water and being a crosslinked silicone resin film,
  wherein the glass laminate has an integral transmittance of 55% or more for a visible light having a wavelength of 400 nm to less than 750 nm and integral transmittance of 50% or less for a near-infrared light having a wavelength of 750 nm to less than 2,100 nm.

10. A glass laminate according to claim 9, wherein the transparent thermoplastic resin film is a biaxially stretched polyethylene terephthalate.

11. A glass laminate according to claim 9, wherein the film for prevention of growth of the waterdrops formed by dew condensation is a water-repellent film having a contact angle of 100° or more against water.

12. A glass laminate according to claim 9, wherein the metal oxide layer is a layer composed of titanium oxide, zirconium oxide or indium oxide.

13. A glass laminate according to claim 9, wherein the metal layer is a layer of at least one kind of metal selected from the group consisting of silver, gold, copper and aluminum.

14. A glass laminate according to claim 9, wherein the integral transmittance for a visible light having a wavelength of 400 nm to less than 750 nm is 60% or more.

15. A glass laminate according to claim 9, wherein the integral transmittance for a near-infrared light having a wavelength of 750 nm to less than 2,100 nm is 45% or less.

16. A greenhouse wherein a glass laminate set forth in claim 9 is used at the lighting area so that the glass surface is positioned outside the greenhouse.

* * * * *